(12) United States Patent
Radcliffe

(10) Patent No.: US 7,032,121 B2
(45) Date of Patent: Apr. 18, 2006

(54) SYSTEM FOR DERIVING DESIRED OUTPUT FREQUENCY BY SUCCESSIVELY DIVIDING CLOCK SIGNAL FREQUENCY BY RATIOS OBTAINED BY DIVIDING CLOCK SIGNAL FREQUENCY BY COMMON DIVISOR AND SPECIFIC INTEGER

(75) Inventor: Jerry Kyle Radcliffe, Raleigh, NC (US)

(73) Assignee: Hatteras Networks, Durham, NC (US)

( * ) Notice: Subject to any disclaimer, the term of this patent is extended or adjusted under 35 U.S.C. 154(b) by 615 days.

(21) Appl. No.: 10/339,280

(22) Filed: Jan. 9, 2003

(65) Prior Publication Data
US 2003/0139913 A1    Jul. 24, 2003

Related U.S. Application Data

(60) Provisional application No. 60/347,606, filed on Jan. 10, 2002.

(51) Int. Cl.
*G06G 6/04* (2006.01)
*G06G 7/60* (2006.01)

(52) U.S. Cl. ........................ 713/501; 708/174; 708/490

(58) Field of Classification Search ..................... None
See application file for complete search history.

(56) References Cited

U.S. PATENT DOCUMENTS

| | | | | |
|---|---|---|---|---|
| 5,287,296 | A | * | 2/1994 | Bays et al. ................. 708/103 |
| 6,067,411 | A | * | 5/2000 | Poimboeuf et al. ......... 713/400 |
| 6,515,708 | B1 | * | 2/2003 | Kato .......................... 348/524 |
| 6,813,721 | B1 | * | 11/2004 | Tetreault et al. ............ 713/400 |

* cited by examiner

*Primary Examiner*—Thuan Du
(74) *Attorney, Agent, or Firm*—Myers Bigel Sibley & Sajovec, P.A.

(57) ABSTRACT

A signal is generated by providing a clock signal having a frequency ($f_{osc}$). The clock frequency $f_{osc}$ is arithmetically divided by an output frequency ($f_o$) associated with the signal to obtain a ratio R and a remainder given by x/y. The signal is derived from the clock signal by successively dividing the frequency ($f_{osc}$) of the clock signal by one of R and R+1, such that a fraction of times that the frequency ($f_{osc}$) of the clock signal is divided by R is given by 1-x/y and a fraction of times that the frequency ($f_{osc}$) of the clock signal is divided by R+1 is given by x/y. In particular, the signal is derived by driving a counter using the clock signal to a count value of one of R and R+1, such that a fraction of times that the counter is driven to a count value of R is given by 1-x/y and a fraction of times that the counter is driven to a count value of R+1 is given by x/y.

12 Claims, 4 Drawing Sheets

SYSTEM FOR DERIVING DESIRED OUTPUT FREQUENCY BY SUCCESSIVELY DIVIDING CLOCK SIGNAL FREQUENCY BY RATIOS OBTAINED BY DIVIDING CLOCK SIGNAL FREQUENCY BY COMMON DIVISOR AND SPECIFIC INTEGER

RELATED APPLICATIONS

This application claims the benefit of Provisional Application No. 60/347,606, filed Jan. 10, 2002, the disclosure of which is hereby incorporated herein by reference.

BACKGROUND OF THE INVENTION

The present invention relates to signal generation, and, more particularly, to deriving one or more lower frequency signals from a higher frequency clock signal.

Conventional signal generators may use multiple oscillators to derive harmonic frequency signals from a clock signal. Unfortunately, this may result in a relatively large number of oscillators; therefore, in practice, only a subset of the harmonic frequencies is typically provided.

Other conventional signal generators may generate signals having frequencies that are not sub-harmonics of a clock signal through the use of alternate ratio counters. These signal generators may use the clock signal to drive two counters whose count differs by one. By alternately combining the outputs of these two counters in an appropriate pattern, a waveform may be generated having a desired average frequency and an edge jitter approximately equal to a cycle of the clock signal. Such signal generators, however, may be less desirable for use in generating a large number of different frequencies as a set of counter ratios and a pattern would typically have to be stored for each frequency to be generated.

Still other conventional signal generators may generate signals by adding a number to a running sum. The adder overflow is a pulse train at the desired frequency. These signal generators, however, typically use an adder with a large number of bits to operate at the generally high clock frequency rate. This may require high-speed logic to generate signals with fine edge jitter. The generated frequencies are the multiple of a binary divisor of the clock signal frequency. More complex logic may be used to allow additional frequencies to be generated beyond the binary divisors of the clock signal frequency. This complex logic, however, operates at the high clock signal frequency.

SUMMARY OF THE INVENTION

According to some embodiments of the present invention, a signal is generated by providing a clock signal having a frequency ($f_{osc}$). The clock frequency $f_{osc}$ is arithmetically divided by an output frequency ($f_o$) associated with the signal to obtain a ratio R and a remainder given by x/y. The signal is derived from the clock signal by successively dividing the frequency ($f_{osc}$) of the clock signal by one of R and R+1, such that a fraction of times that the frequency ($f_{osc}$) of the clock signal is divided by R is given by 1−x/y and a fraction of times that the frequency ($f_{osc}$) of the clock signal is divided by R+1 is given by x/y. In particular, the signal is derived by driving a counter using the clock signal to a count value of one of R and R+1, such that a fraction of times that the counter is driven to a count value of R is given by 1−x/y and a fraction of times that the counter is driven to a count value of R+1 is given by x/y.

In further embodiments of the present invention, driving the counter comprises initializing a sum to a value less than y and then repetitively performing the following operations at the clock signal frequency: The sum is incremented by x. If the sum is less than y, then the count value of the counter is set to R. If the sum is not less than y, then the count value of the counter is set to R+1 and the sum is decremented by y. Jitter represents deviation of the clock edges from their ideal locations and may amount to one period of the clock signal. Advantageously, the present invention may reduce jitter by allowing computations to be performed at the lower generated signal frequency so that the clock signal frequency may be increased.

In still further embodiments of the present invention, one or more lower frequency signals are derived from a higher frequency clock signal. In particular, these lower frequency signals may correspond to integer multiples of a lower frequency reference signal $f_r$. For example, a signal may be generated by providing a clock signal having a frequency ($f_{osc}$). A common divisor between the clock frequency ($f_{osc}$) and a reference frequency ($f_r$) is determined. The signal has an output frequency ($f_o$) given by $k*f_r$ where k is an integer. The clock frequency ($f_{osc}$) is divided by the common divisor to obtain a value N and the value N is divided by the integer k to obtain a ratio R and a remainder given by r/k. The signal is derived from the clock signal by successively dividing the frequency ($f_{osc}$) of the clock signal by one of R and R+1, such that a fraction of times that the frequency ($f_{osc}$) of the clock signal is divided by R is given by 1−r/k and a fraction of times that the frequency ($f_{osc}$) of the clock signal is divided by R+1 is given by r/k.

Although described primarily above with respect to method aspects of deriving one or more signals from a clock signal using alternate ratio frequency division, it will be understood that the present invention may also be embodied as systems and computer program products for deriving one or more signals from a clock signal using alternate ratio frequency division.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
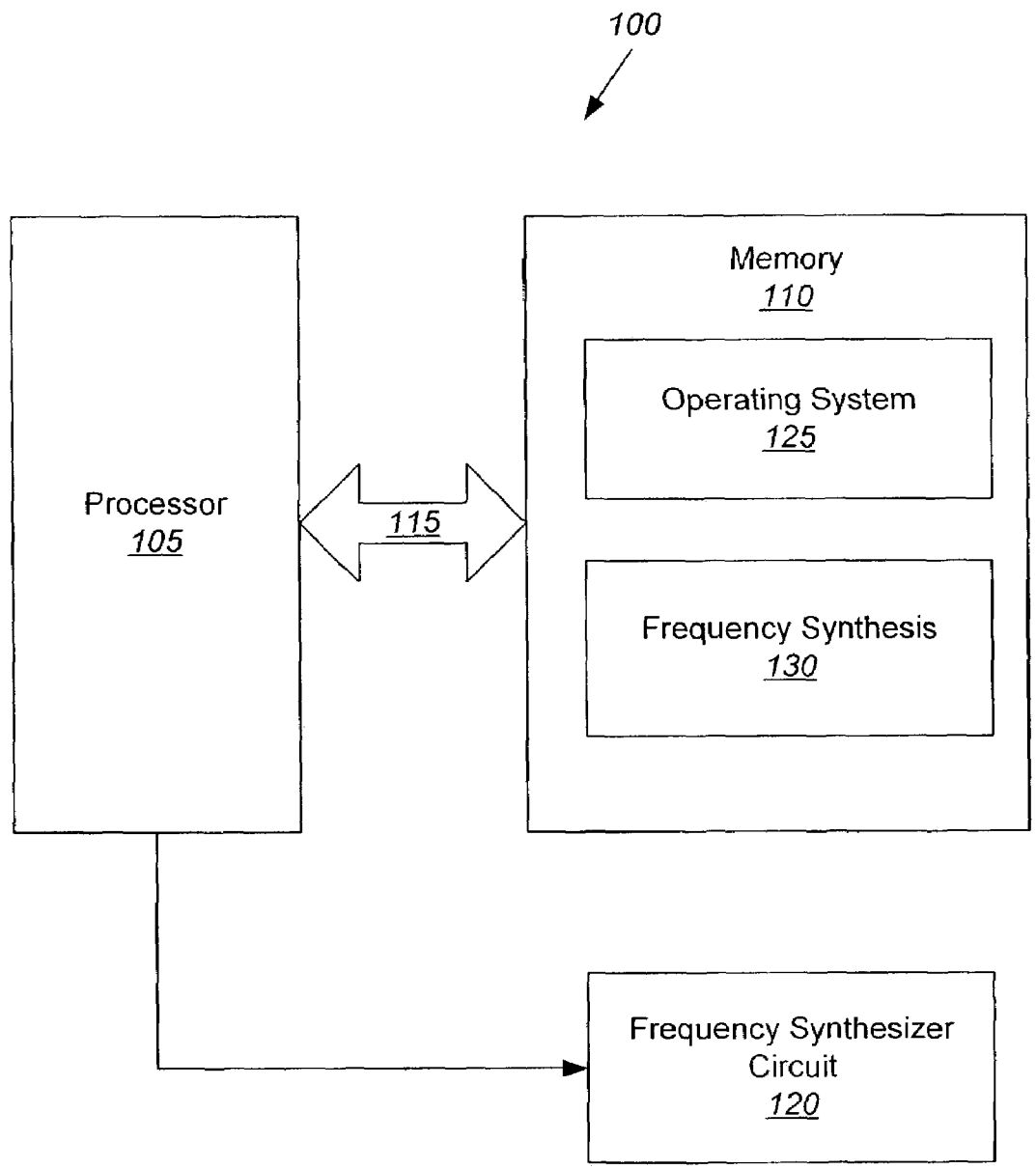
FIG. 1 is a block diagram that illustrates a software/hardware architecture for generating a signal in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

The present invention may be embodied as systems, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 illustrates a signal generation system 100 in accordance with some embodiments of the present invention. The signal generation system 100 comprises a processor 105, a memory 110, an address/data bus 115, and a frequency synthesizer circuit 120. The processor 105 communicates with the memory 110 via the address/data bus 115. The processor 105 may be, for example, a commercially available or custom microprocessor. The memory 110 is representative of the one or more memory devices containing the software and data used to derive a signal from a clock signal using alternate ratio frequency division. The memory 110 may include, but is not limited to, the following types of devices: cache, ROM, PROM, EPROM, EEPROM, flash, SRAM, and DRAM.

As shown in FIG. 1, the memory 110 may contain up to two or more categories of software and/or data: an operating system 125 and a frequency synthesis module 130. The operating system 125 generally controls the operation of the signal generation system 100. In particular, the operating system 125 may manage the signal generation system's software and/or hardware resources and may coordinate execution of programs by the processor 105. The frequency synthesis module 130 may be configured to compute various variables and/or to process user input, which may then be used to control the frequency synthesizer circuit 120 in deriving one or more signals from a clock signal using alternate ratio frequency division. An exemplary embodiment of a circuit that may be used as the frequency synthesizer circuit 120 will be described below with reference to FIG. 4.

Although FIG. 1 illustrates an exemplary signal generation software/hardware architecture in accordance with some embodiments of the present invention, it will be understood that the present invention is not limited to such a configuration but is intended to encompass any configuration capable of carrying out operations described herein.

Computer program code for carrying out operations of a signal generation system discussed above with respect to FIG. 1 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, and computer program products in accordance with exemplary embodiments of the invention. These flowchart and/or block diagrams further illustrate exemplary operations of deriving one or more signals from a clock signal using alternate ratio frequency division in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
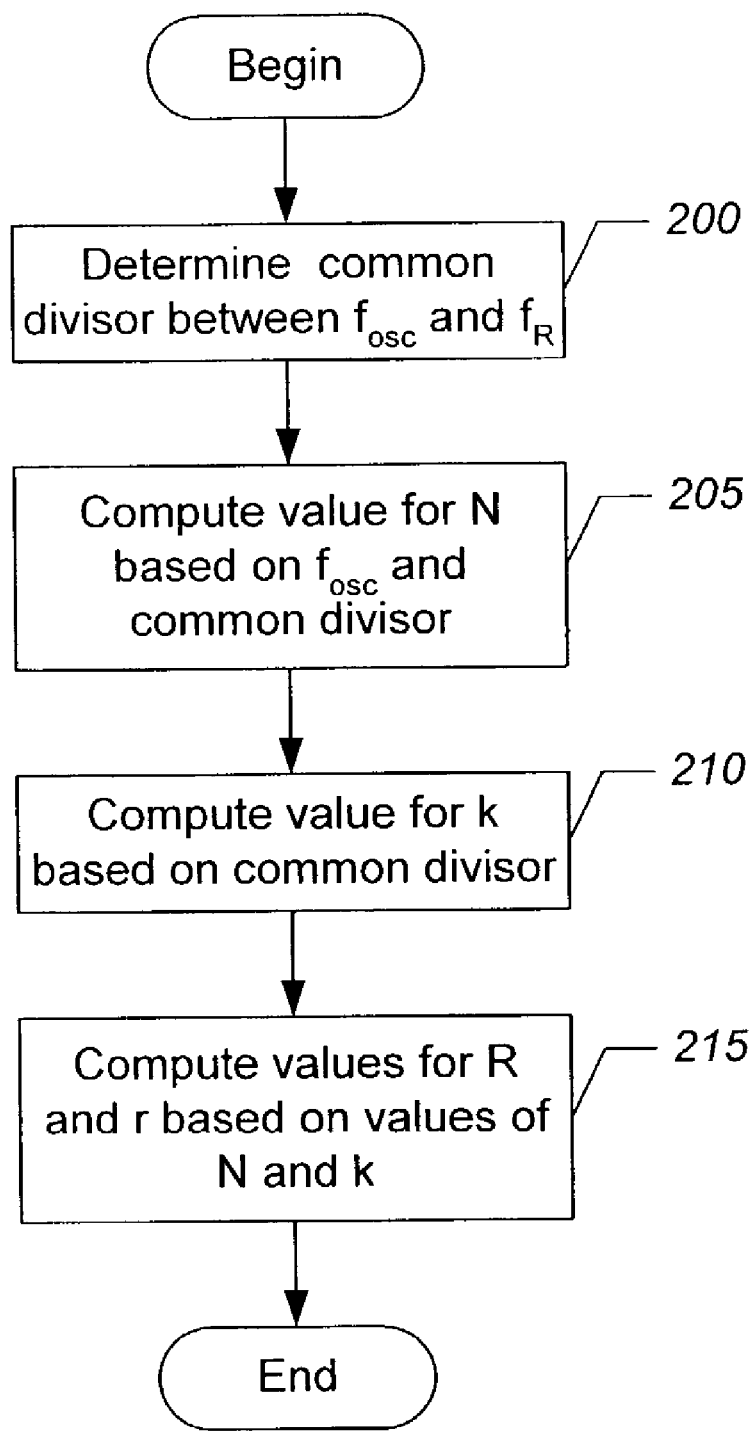
FIGS. 2 and 3 are flowcharts that illustrate operations for generating a signal in accordance with some embodiments of the present invention.

Referring now to FIG. 2, exemplary operations for deriving one or more signals from a clock signal using alternate ratio frequency division in accordance with some embodiments of the present invention will now be described. The desired output signal frequencies ($f_o$) of the one or more derived signals may be given by Equation 1 below:

$$f_o = k \times f_r = k \times \frac{f_{osc}}{N} \qquad \text{EQ. 1}$$

where k and N are integers, $f_r$ is a reference frequency, and $f_{osc}$ is a frequency of a clock signal. Operations begin at block 200 where the frequency synthesis module 130 of FIG. 1, for example, determines a common divisor between $f_{osc}$ and $f_r$. In an SHDSL system, for example, where it is desired to generate frequencies of k*64 KHz, where $3 \leq k \leq 144$ and a 125 MHz clock signal is available for use as $f_{osc}$, a common divisor between $f_{osc}$ (125 MHz) and $f_r$ (64 KHz) is 8 KHz.

At block 205, the value N is computed by dividing the clock signal frequency $f_{osc}$ by the common divisor. In the above example, N is given by 125 MHz/8 KHz=15625. The value for k is computed at block 210 based on the common divisor. Specifically, if the clock signal frequency $f_{osc}$ is not divisible by the reference frequency $f_r$, then the value(s) for k are scaled as follows: $(f_r/(\text{common divisor}))*k$. In the above example, $f_r$ (64 KHz)/8 KHz=8. Thus, k is scaled to be in the range $24 \leq k \leq 1152$.

At block 215, an integer ratio R and a remainder r/k is computed according to Equation 2 below:

$$\frac{N}{k} = R + \frac{r}{k} \qquad \text{EQ. 2}$$

Based on the above example, if it is desired to generate an output signal frequency $f_o$ of 127*64 kHz=8.128 MHz, then k is given by 8*127=1016 (recall the scaling factor for k at block 210), N/k=15+385/1016, which results in R=15 and r=385. The desired output signal frequency $f_o$ may be derived by successively dividing the clock signal frequency $f_{osc}$ by one of R and R+1, such that a fraction of times that the frequency $f_{osc}$ of the clock signal is divided by R is given by 1−r/k and a fraction of times that the frequency $f_{osc}$ of the clock signal is divided by R+1 is given by r/k. Advantageously, this may be implemented by using the output clock signal to drive a single counter to counts of either R or R+1. Exemplary operations for determining which count value to use, R or R+1, will now be described with reference to FIG. 3.

Figure 3:
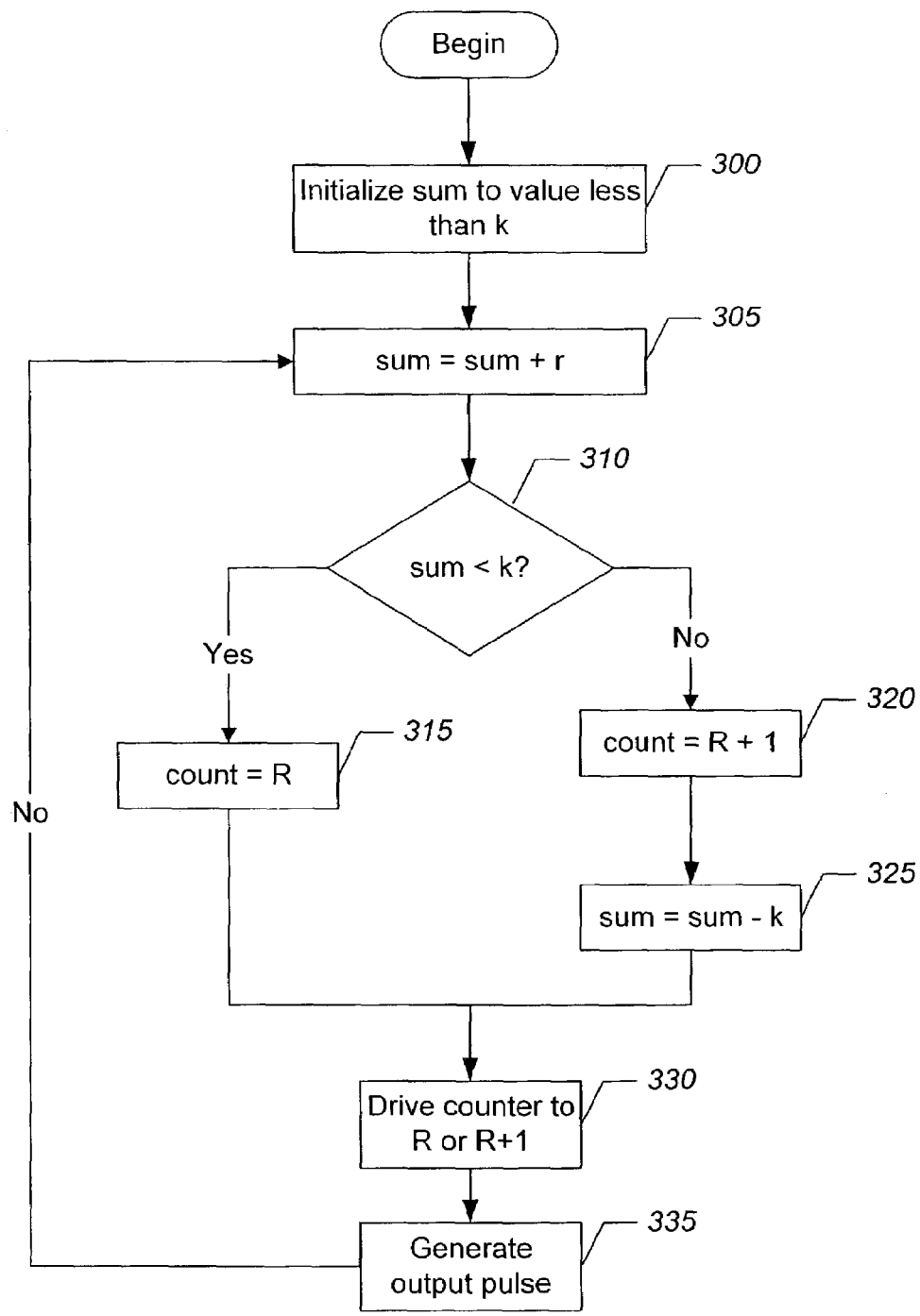

Referring now to FIG. 3, operations begin at block 300 where a sum is initialized to a value less than k. At block 305, the sum is incremented by the value r. A determination is made at block 310 whether the sum is less than k. If the sum is less than k, then a count value is set to R at block 315. If, however, the sum is not less than k, the count value is set to R+1 at block 320. The sum is then decremented by k at block 325. At block 330, a counter is driven to a count of either R or R+1 and the output signal is derived from the counter at block 335. After generating the output pulse, operations continue at block 305. Thus, the operations of blocks 310 through 335 are performed at the output signal frequency rate. Based on the foregoing operations of FIG. 3, the clock signal frequency $f_{osc}$ may be divided by R, on average, (1−r/k)*100% of the time and may be divided by R+1, on average, (r/k)*100% of the time to generate the output signal frequency $f_o$.

The flowcharts of FIGS. 2 and 3 illustrate the architecture, functionality, and operations of embodiments of signal generation system software. In this regard, each block represents a module, segment, or portion of code, which comprises one or more executable instructions for implementing the specified logical function(s). It should also be noted that in some alternative implementations, the function(s) noted in the blocks may occur out of the order noted in FIGS. 2 and 3. For example, two blocks shown in succession may, in fact, be executed substantially concurrently or the blocks may sometimes be executed in the reverse order, depending on the functionality involved.

Figure 4:
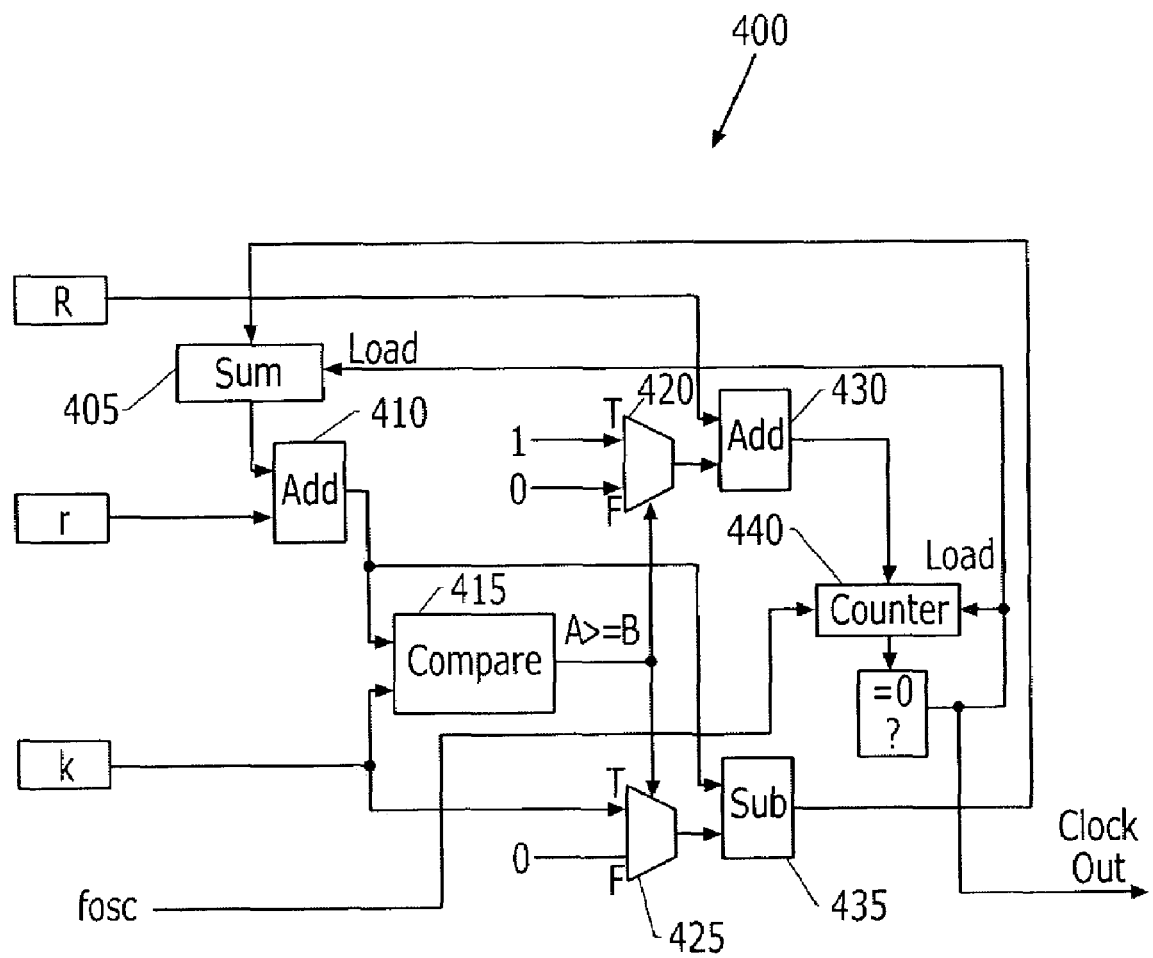
FIG. 4 is a block diagram that illustrates a frequency synthesizer circuit in accordance with some embodiments of the present invention.

An exemplary frequency synthesizer circuit 400 that may be used, for example, to implement the frequency synthesizer circuit 120 of FIG. 1 and may also be used to carry out operations of FIG. 3, for example, is shown in FIG. 4. The frequency synthesizer circuit 400 comprises a summation unit 405, an adder 410, a comparator 415, multiplexers 420 and 425, an adder 430, a subtractor 435, and a counter 440, which are configured as shown. The values R, r, and k may be provided by the frequency synthesis module 130 of FIG. 1 as discussed above with respect to FIG. 2.

Exemplary operations of the frequency synthesizer unit 400 will now be described with frequent reference to FIGS. 3 and 4. The summation unit 405 is initialized to a value less than k (block 300, FIG. 3). The adder 410 increments the sum in the summation unit 405 by r (block 305, FIG. 3). The comparator 415 determines whether the output of the adder 410 is less than k (block 310, FIG. 3). If the comparator 415 determines that the output of the adder 410 (sum+r) is less than k, then the multiplexer 420 passes a value of zero to its output so that the adder 430 does not increment R by one (block 315, FIG. 3). In addition, the multiplexer 425 passes a value of zero to its output so that the subtractor 435 does not subtract k from the output of the adder 410 (sum+r). If, however, the comparator 415 determines that the output of the adder 410 (sum+r) is not less than k (block 310, FIG. 3), then the multiplexer 420 passes a value of one to its output so that the adder 430 increments R by one (block 320, FIG. 3). In addition, the multiplexer 425 passes a value of k to its output so that the subtractor 435 subtracts k from the output of the adder 410 (sum+r) (block 325, FIG. 3). The counter, which is driven by the clock signal having a frequency $f_{osc}$ may then be loaded with counts of either R or R+1 from the output of the adder 430. The desired output signal having a frequency of $f_o$ may be derived by counting down from the values R or R+1 and detecting underflow at a count of zero. The summation unit 405 may then be loaded with a new value from the output of the subtractor 435 and the counter 440 may be loaded with a new count value from the output of the adder 430 upon detecting underflow.

The present invention has been described above in the context of signal generation system, method, and computer program product embodiments that may generate one or more lower frequency signals from a higher frequency clock signal. In particular, these lower frequency signals may correspond to integer multiples of a lower frequency reference signal $f_r$. It should be understood that in other embodiments of the present invention, a single output signal may be generated having an output frequency $f_o$ and the variables k and N may be eliminated. In this case, the clock signal frequency $f_{osc}$ may be divided by the desired output frequency $f_o$ to obtain a ratio (count value) R and a remainder x/y. The exemplary operations of FIG. 3 for determining which count value to use, R or R+1, may be performed using the values x and y in place of r and k.

Advantageously, signal generation systems, in accordance with embodiments of the present invention, may allow multiple frequencies to be generated by operating a single counter using alternate ratios (i.e., count values R and R+1)

without the need to use look up tables for the count pattern (i.e., the sequence of R and R+1 count values). In accordance with some embodiments of the present invention, the count pattern may be computed using a frequency synthesizer circuit and the pattern calculations may be computed at the rate of the output clock ($f_o$) rather than the rate of the higher speed clock ($f_{osc}$), which is used to drive the counter. As a result, the frequency synthesizer circuit may be embodied using slower, lower cost circuitry.

Many variations and modifications can be made to the preferred embodiments without substantially departing from the principles of the present invention. All such variations and modifications are intended to be included herein within the scope of the present invention, as set forth in the following claims.

I claim:

1. A method of generating a signal, comprising:
   providing a clock signal having a frequency ($f_{osc}$);
   determining a common divisor between the clock frequency ($f_{osc}$) and a reference frequency ($f_r$), the signal having an output frequency ($f_o$) given by $k*f_r$ where k is an integer;
   dividing the clock frequency ($f_{osc}$) by the common divisor to obtain a value N;
   dividing the value N by the integer k to obtain a ratio R and a remainder given by r/k;
   successively driving a counter using the clock signal to a count value of one of R and R+1, such that a fraction of times that the counter is driven to a count value of R is given by 1−r/k and a fraction of times that the counter is driven to a count value of R+1 is given by r/k; and
   deriving the signal from an output of the counter.

2. The method of claim 1, wherein successively driving the counter comprises:
   initializing a sum to a value less than k;
   repetitively performing the following at the signal frequency:
     incrementing the sum by r;
     determining if the sum is less than k;
     setting the count value to R if the sum is less than k;
     setting the count value to R+1 if the sum is not less than k; and
     decrementing the sum by k if the sum is not less than k.

3. A method of generating a signal, comprising:
   providing a clock signal having a frequency ($f_{osc}$);
   dividing the clock frequency ($f_{osc}$) by an output frequency ($f_o$) associated with the signal to obtain a ratio R and a remainder given by x/y;
   successively driving a counter using the clock signal to a count value of one of R and R+1, such that a fraction of times that the counter is driven to a count value of R is given by 1−x/y and a fraction of times that the counter is driven to a count value of R+1 is given by x/y; and
   deriving the signal from an output of the counter.

4. The method of claim 3, wherein successively driving the counter comprises:
   initializing a sum to a value less than y;
   repetitively performing the following at the signal frequency:
     incrementing the sum by x;
     determining if the sum is less than y;
     setting the count value to R if the sum is less than y;
     setting the count value to R+1 if the sum is not less than y; and
     decrementing the sum by y if the sum is not less than y.

5. A system for generating a signal, comprising:
   means for providing a clock signal having a frequency ($f_{osc}$);
   means for determining a common divisor between the clock frequency ($f_{osc}$) and a reference frequency ($f_r$), the signal having an output frequency ($f_o$) given by $k*f_r$ where k is an integer;
   means for dividing the clock frequency ($f_{osc}$) by the common divisor to obtain a value N;
   means for dividing the value N by the integer k to obtain a ratio R and a remainder given by r/k;
   means for successively driving a counter using the clock signal to a count value of one of R and R+1, such that a fraction of times that the counter is driven to a count value of R is given by 1−r/k and a fraction of times that the counter is driven to a count value of R+1 is given by r/k; and
   means for deriving the signal from an output of the counter.

6. The system of claim 5, wherein the means for successively driving the counter comprises:
   means for initializing a sum to a value less than k;
   means for incrementing the sum by r;
   means for determining if the sum is less than k;
   means for setting the count value to R if the sum is less than k;
   means for setting the count value to R+1 if the sum is not less than k; and
   means for decrementing the sum by k if the sum is not less than k;
   wherein the means for initializing, the means for incrementing, the means for setting the count value to R, the means for setting the count value to R+1, and the means for decrementing operate at the signal frequency.

7. A system for generating a signal, comprising:
   means for providing a clock signal having a frequency ($f_{osc}$);
   means for dividing the clock frequency ($f_{osc}$) by an output frequency ($f_o$) associated with the signal to obtain a ratio R and a remainder given by x/y; and
   means for successively driving a counter using the clock signal to a count value of one of R and R+1, such that a fraction of times that the counter is driven to a count value of R is given by 1−x/y and a fraction of times that the counter is driven to a count value of R+1 is given by x/y; and
   means for deriving the signal from an output of the counter.

8. The system of claim 7, wherein the means for successively driving the counter comprises:
   means for initializing a sum to a value less than y;
   means for incrementing the sum by x;
   means for determining if the sum is less than y;
   means for setting the count value to R if the sum is less than y;
   means for setting the count value to R+1 if the sum is not less than y; and
   means for decrementing the sum by y if the sum is not less than y;
   wherein the means for initializing, the means for incrementing, the means for setting the count value to R, the means for setting the count value to R+1, and the means for decrementing operate at the signal frequency.

9. A computer program product for generating a signal, comprising:

a computer readable storage medium having computer readable program code embodied therein, the computer readable program code comprising:

computer readable program code configured to provide a clock signal having a frequency ($f_{osc}$);

computer readable program code configured to determine a common divisor between the clock frequency ($f_{osc}$) and a reference frequency ($f_r$), the signal having an output frequency ($f_o$) given by $k*f_r$ where k is an integer;

computer readable program code configured to divide the clock frequency ($f_{osc}$) by the common divisor to obtain a value N;

computer readable program code configured to divide the value N by the integer k to obtain a ratio R and a remainder given by r/k;

computer readable program code configured to successively drive a counter using the clock signal to a count value of one of R and R+1, such that a fraction of times that the counter is driven to a count value of R is given by 1−r/k and a fraction of times that the counter is driven to a count value of R+1 is given by r/k; and computer readable program code configured to derive the signal from an output of the counter.

10. The computer program product of claim 9, wherein the computer readable program code configured to successively drive the counter comprises:

computer readable program code configured to initialize a sum to a value less than k;

computer readable program code configured to increment the sum by r;

computer readable program code configured to determine if the sum is less than k;

computer readable program code configured to set the count value to R if the sum is less than k;

computer readable program code configured to set the count value to R+1 if the sum is not less than k; and computer readable program code configured to decrement the sum by k if the sum is not less than k;

wherein the computer readable program code configured to initialize, the computer readable program code configured to increment, the computer readable program code configured to set the count value to R, the computer readable program code configured to set the count value to R+1, and the computer readable program code configured to decrement operate at the signal frequency.

11. A computer program product for generating a signal, comprising:

a computer readable storage medium having computer readable program code embodied therein, the computer readable program code comprising:

computer readable program code configured to provide a clock signal having a frequency ($f_{osc}$);

computer readable program code configured to divide the clock frequency ($f_{osc}$) by an output frequency ($f_o$) associated with the signal to obtain a ratio R and a remainder given by x/y;

computer readable program code configured to successively drive a counter using the clock signal to a count value of one of R and R+1, such that a fraction of times that the counter is driven to a count value of R is given by 1-x/y and a fraction of times that the counter is driven to a count value of R+1 is given by x/y; and computer readable program code configured to derive the signal from an output of the counter.

12. The computer program product of claim 11, wherein the computer readable program code configured to successively drive the counter comprises:

computer readable program code configured to initialize a sum to a value less than y;

computer readable program code configured to increment the sum by x;

computer readable program code configured to determine if the sum is less than y;

computer readable program code configured to set the count value to R if the sum is less than y;

computer readable program code configured to set the count value to R+1 if the sum is not less than y; and computer readable program code configured to decrement the sum by y if the sum is not less than y;

wherein the computer readable program code configured to initialize, the computer readable program code configured to increment, the computer readable program code configured to set the count value to R, the computer readable program code configured to set the count value to R+1, and the computer readable program code configured to decrement operate at the signal frequency.

* * * * *